United States Patent
Duffy

(10) Patent No.: US 7,697,671 B1
(45) Date of Patent: Apr. 13, 2010

(54) ENHANCED-SOFTWARE DEFINED DATA NETWORK

(75) Inventor: John Duffy, Hopewell Junction, NY (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1202 days.

(21) Appl. No.: 11/260,984

(22) Filed: Oct. 28, 2005

Related U.S. Application Data

(60) Provisional application No. 60/627,973, filed on Nov. 15, 2004.

(51) Int. Cl.
*H04M 15/00* (2006.01)

(52) U.S. Cl. .......................... 379/114.03; 379/121.02; 379/240

(58) Field of Classification Search ............ 379/114.03, 379/114.04, 114.06, 121.01, 121.02, 235, 379/240; 370/352, 386
See application file for complete search history.

(56) References Cited

U.S. PATENT DOCUMENTS

| | | | |
|---|---|---|---|
| 3,934,095 A | 1/1976 | Matthews et al. | |
| 5,550,834 A * | 8/1996 | D'Ambrogio et al. | 370/385 |
| 6,415,024 B1 | 7/2002 | Dunn et al. | |
| 6,490,345 B2 | 12/2002 | Fleischer, III et al. | |
| 6,532,281 B1 | 3/2003 | Schoenborn | |
| 6,567,514 B2 * | 5/2003 | Fleischer et al. | 379/221.03 |
| 6,687,351 B1 * | 2/2004 | Antrim et al. | 379/157 |
| 6,771,753 B2 | 8/2004 | Fleischer, III et al. | |
| 6,813,497 B2 | 11/2004 | Hutcheson | |
| 2004/0165613 A1 | 8/2004 | Kim et al. | |

* cited by examiner

*Primary Examiner*—Quoc D Tran
(74) *Attorney, Agent, or Firm*—Hanley, Flight & Zimmerman, LLC

(57) ABSTRACT

A method and system of providing data calls to a subscriber having a data network, such as an integrated services digital network (ISDN), connected to a network switch to enable communication with another party at a fixed rate are disclosed. The methodology discovers a data calls system that enables data calls to be placed over trunk lines for communication with a subscriber having an ISDN with a dedicated ISDN line connected to a network edge switch forming a trunk line of the ISDN in communication with a central office. A plurality of base stations are adapted to make and receive data calls using the ISDN over the trunk line. A billing apparatus charges each subscriber a fixed or flat rate per service period for data calls using the trunk line, for the plurality of stations, regardless of the number of calls using the base stations during the service period.

13 Claims, 2 Drawing Sheets

ENHANCED-SOFTWARE DEFINED DATA NETWORK

CROSS REFERENCE TO RELATED APPLICATIONS

The present application claims priority to U.S. Provisional Patent Application Ser. No. 60/627,973 filed on Nov. 15, 2004.

FIELD

The embodiments relate to methods and systems for providing data calls to a subscriber using a software-defined data network (e.g., an integrated services digital network (ISDN)) for communication over trunk lines at a fixed or flat rate plan.

BACKGROUND

Traditionally, United States policies for providing telecommunications services and for billing for such services have required independent billing with regard to the content of the communication. Regulatory and social factors which have influenced separate treatment of such calls are defined as the different economic and/or social values of data calls as contrasted with voice calls. However, pressures exists to minimize charges for minimum local services and to insure that even high usage local services remain within the economic means of the customers, particularly the elderly and the poor.

A partial solution to this problem has been implemented in some cases by examining the destination number of telephone calls as part of the bill calculation process; this process then distinguishes calls known on the basis of the called number to be data calls from other calls and therefore gives such calls appropriate billing treatment.

Another problem, however, has been that many of the current telephone network providers are designed for voice calls, which average five minutes or less per call; and therefore, the network providers bill on a per minute charge rate. With more and more people using telephone lines for data services, the per minute charges for switching data traffic to provide the online services has become very expensive. Additionally, some existing fixed rate data services have offered a much higher fixed rate charge for providing online telecommunications services and use of vertical services, such as special transmission facilities or stations.

A need exists for a system and method to provide data calls to a subscriber using an integrated services digital network (ISDN) for telecommunications and for providing the service over trunk lines for billing at a fixed or planned rate per service period to avoid per minute charges.

A need exists for recognizing data calls and configuring a data calls system so that different affordable charges and/or flat rate charging per service period can be applied to such telecommunications that might use vertical services, such as special transmission facilities or base stations.

The embodiments meet these needs.

SUMMARY

The present methods and systems are for providing data calls to a subscriber using a software-defined data network, such as an integrated services digital network (ISDN), connected to a network edge switch to enable communication with another party over a trunk line. The communication can be provided at a fixed or flat rate for a particular service period. The ability to monitor the existing service activity and offer different rate plans to a user at termination of the existing service period can be provided by the system.

The embodiments include methods for providing data calls to a subscriber having an integrated services digital network (ISDN) for communicating with at least one party over trunk lines. The subscribers of this service can be billed at a fixed or flat rate plan per service period.

The embodiments include a data calls system that permits data calls to be placed over a trunk line and connect to a subscriber, who has an integrated services digital network (ISDN) with a dedicated ISDN T1.5 line. The ISDN T1.5 line is connected to a network edge switch (e.g., nodal switch) forming a trunk line to enable the data calls. The data calls can comprise data packets to be placed over the trunk line by the subscriber. The trunk line of the integrated services digital network (ISDN) can be in communication with a central office. A plurality of base stations can be included in the system and can be adapted to make and receive data calls using the integrated services digital network over the trunk lines. At least one subscriber is associated with the base station for the data calls. The data calls system can include a billing apparatus for charging each subscriber at a fixed or flat rate per service period for data calls using the trunk line and the plurality of base stations. This flat or fixed rate per service period can apply regardless of the number of calls made to the base stations or calls placed using the base stations during the service period (for example, calendar-based time period).

BRIEF DESCRIPTION OF THE DRAWINGS

The detailed description will be better understood in conjunction with the accompanying drawings as follows.

Figure 1:
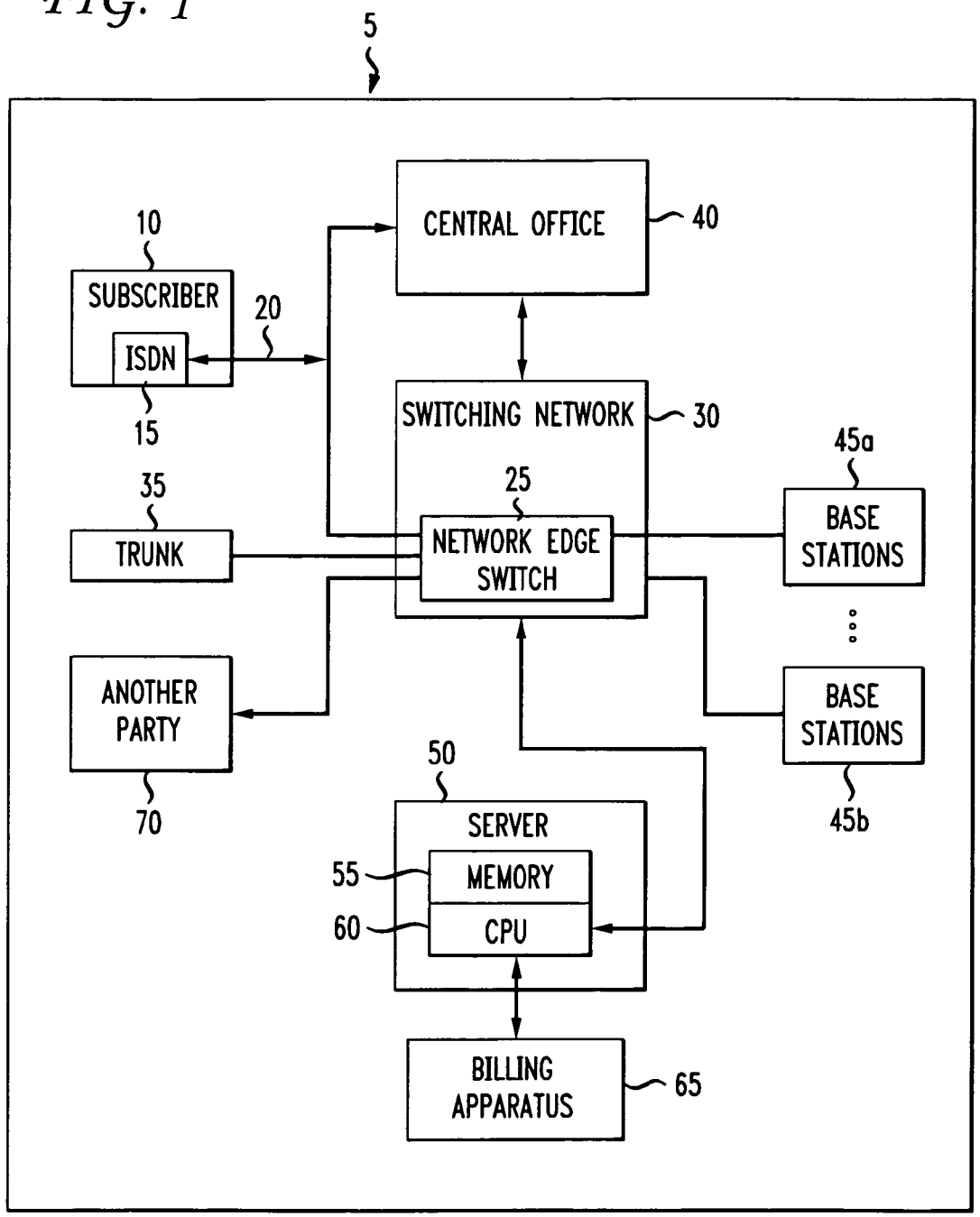
FIG. 1 depicts an embodiment of a data calls system for enabling data calls to be placed over a trunk line and connect to a subscriber having an integrated services data network.

The embodiments are detailed below with reference to the listed Figure.

DETAILED DESCRIPTION OF THE EMBODIMENTS

Before explaining the disclosed embodiments of the invention in detail, it is to be understood that the invention is not limited to the particular embodiments and can be practiced or carried out in various ways.

The embodiments relate to methods and systems for providing data calls to a subscriber using a software-defined data network, such as an integrated services digital network (ISDN). The ISDN can be connected to a network edge switch to enable communication over trunk lines at a fixed or flat rate for a particular service period. Advantageously, this permits different charge plans or affordable flat rate charging to be imposed on data calls of a network regardless of the number of data calls or use of the stations supporting the data calls. This provides a cost-effective alternative to per minute charges for data calls and can assists in minimizing charges for telecommunications services for the customers of the network.

The embodiments relate to methods and systems of providing data calls for a subscriber using a data network, such as an integrated services digital network (ISDN). The subscriber, as a part of the integrated services digital network (ISDN), acquires a dedicated ISDN T1.5 line. Next, the ISDN T1.5 line can be connected to a network edge switch (for example, a nodal switch) for the purpose of forming a trunk line of the ISDN in communication with a central office to enable data calls to be placed at a fixed billing rate. The data calls can comprise data packets, which can be placed over the trunk line by the subscriber.

The trunk lines of the ISDN can have end-to-end connections consisting of Data Enabling Device (DED) to Switched Network connections or DED to DED connections with rate plans based on the end-to-end connections. Rate plans for billing can be at a fixed rate per service period for using the trunk line regardless of a number of calls placed from the integrated services digital network (ISDN) or a duration of the calls placed during a service period. The present method includes service periods that can be a calendar-based time period, such as a week, a month, a calendar quarter, or a calendar year.

The methods can include the use of a plurality of base stations that can be adapted to make and receive data calls between the subscriber and another party, using the subscriber's integrated services digital network (ISDN) over the trunk line.

Certain embodiments of the invention can also employ a billing apparatus. The billing apparatus can be adapted for billing each subscriber at a flat or fixed rate per service period for data calls using the trunk line of the ISDN. The billing can be for a plurality of base stations regardless of the number of calls made to the base stations or calls placed using the base stations during a service period. The billing method includes a step for monitoring the integrated services digital network (ISDN) during a first data call and permitting the first data call to continue, without additional charges, when additional data calls are connected to the first data call.

Certain embodiments of the invention can further include the step of monitoring the integrated services digital network (ISDN) during a call and creating different rate plans based on data comprising a member from the group of: number of data calls placed, time of data calls, duration of data calls, and combinations thereof. The different rate plans can be offered to a user at the termination of the existing service period.

The certain embodiments of the invention generally relate to a data calls system enabling data calls, that can comprise data packets, to be placed over a trunk line and connect with a subscriber having an integrated services digital network (ISDN) with a central office communication. The embodied system permits the subscriber to have a dedicated ISDN T1.5 line connected to a network edge switch (e.g., nodal switch) to form a trunk line of the ISDN in communication with the central office. The trunk line can be a GR 303 trunk to the central office switch. Packets of data information, or data calls, can be communicated through the data calls system, for example, by packet switching networks that are interconnected by these high speed digital trunks, which can be terminated on both ends by trunk controllers. The trunk line end-to-end connections can consists of a Data Enabling Device (DED) to a Switched Network connection or a DED to a DED connection.

Further, the data calls system can include a plurality of base stations that can be adapted to make and receive data calls using the integrated services digital network (ISDN) over the trunk line. For example, when a subscriber dials a requested telephone number, a connection is established between a base station and an outgoing trunk line. When the other party receives the call and answers, a second connection is created to bridge the communication on this trunk line of the ISDN for the calling subscriber. At least one subscriber is associated with at least one base station in the data calls system.

A billing apparatus, included in the embodied system and interacting with a server system, can be adapted for billing each subscriber at a flat or fixed rate per service period for data calls using the trunk line. This billing can be for the plurality of base stations regardless of the number of calls made to the base stations or calls placed using the base stations during a service period (for example, the service period is a calendar-based time period). Variations in the billing structure can include going from a "do not bill for flat rate trunk calls" to a configuration to "bill by flat rate trunk calls". Other variations can include a "do not bill from flat rate trunk calls" to bill by any service provider on a network site or any service provider-handled endpoint.

The data calls system can include a network server system with a processor and memory for receiving, recording, and storing data information in the form of a subscriber profile for each subscriber. The subscriber profile can include such data information as billing data and subscriber service data for each subscriber. Accordingly, the server system interacts with the billing apparatus to provide the subscribers with fixed rate or planned rate billing per service period. Additionally, this data information can be used to assist in configuring and offering different rate plans to a user at termination of the existing service period. The network server system also serves to control operations for switching networks including receiving information for telecommunications connections.

FIG. 1 depicts an embodiment of a data calls system (5) for enabling data calls to be placed over a trunk line and connect to a subscriber. The subscriber (10) has an integrated services digital network (ISDN) (15) with a dedicated ISDN T1.5 line (20) connected to a network edge switch (25) in a data switching network (30). A trunk line (35) connects to the ISDN T1.5 line (20) through the network edge switch (25) forming a trunk line of the ISDN (75) in communication with a central office (40). A plurality of base stations (45*a* and 45*b*) are adapted to make and receive data calls using the ISDN over the trunk line (75) to allow the subscriber (10) to communicate with another party (70). A billing apparatus (65) uses a network server system (50) with a memory (55) and a central processing unit (60) to receive subscriber billing and service data and, then, charges each subscriber a fixed or flat rate per service period.

The embodiments include computer readable medium having stored thereon a plurality of instructions, the plurality of instructions including instructions which, when executed by a processor, cause the processor to perform the embodied methods providing data calls for a subscriber having an integrated services digital network for communicating with at least one party.

Figure 2:
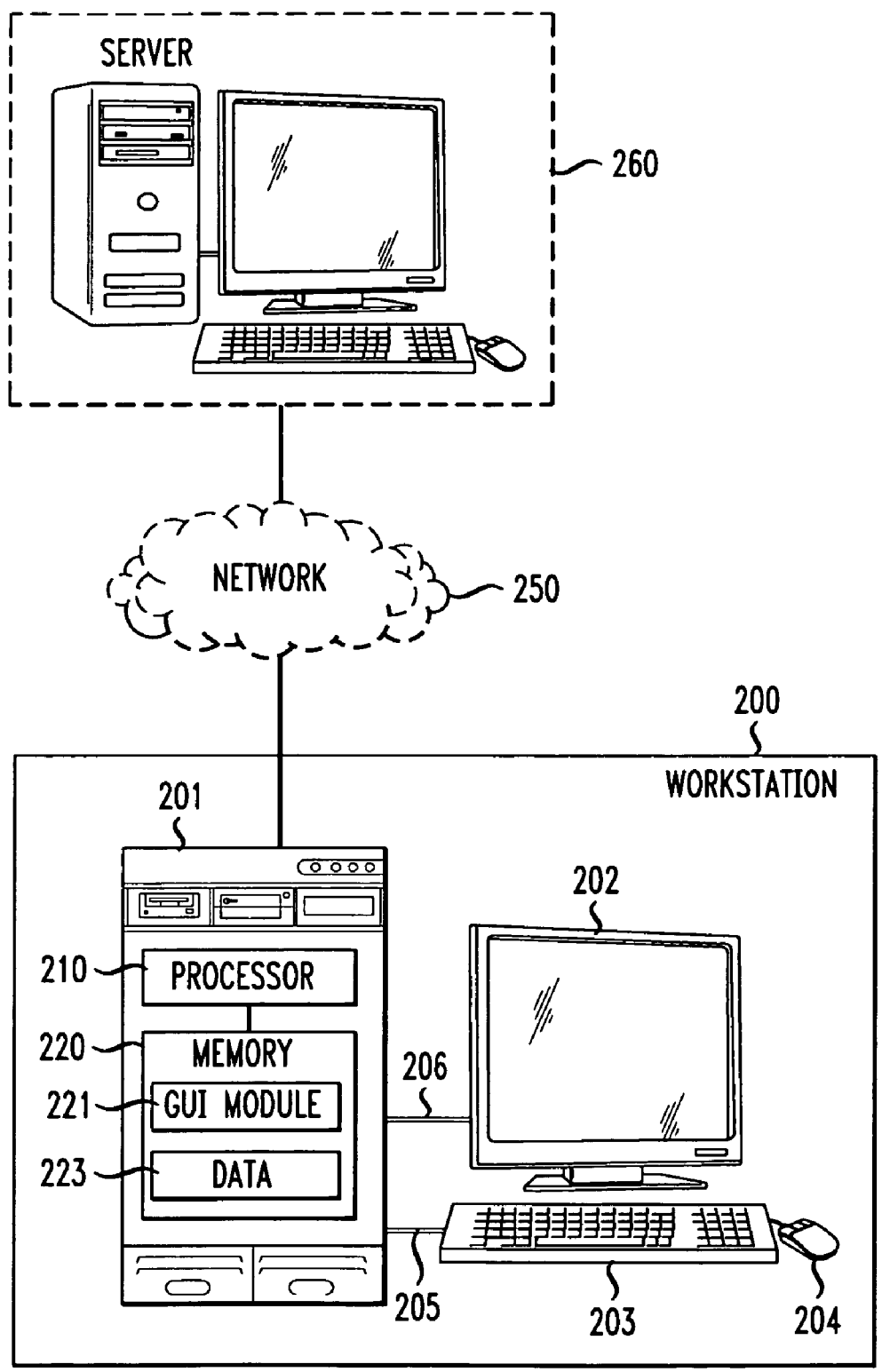
FIG. 2 depicts an illustration of a computer system to perform the embodied methods.

FIG. 2 depicts an illustration of a computer system to perform the embodied methods. A workstation 200 includes computer 201, which can be coupled to a video display 202 via an external graphics bus 206. The external graphics bus 206 can be an Advanced Graphics Port (AGP) compliant bus. The term "coupled" encompasses a direct connection, an indirect connection, or the like. Computer 201 in one embodiment includes a processor 210, such as the Pentium™ III processor manufactured by Intel Corp. of Santa Clara, Calif. In another embodiment, the processor 210 can be an Application Specific Integrated Circuit (ASIC). Computer 201 can include a memory 220 coupled to the processor. Memory 220 encompasses devices adapted to store digital information, such as Dynamic Random Access Memory (DRAM), Rambus™ DRAM (RDRAM), flash memory, a hard disk, an optical digital storage device, a combination thereof, etc. The computer 201 can be coupled to a keyboard 203 and a mouse 204 via an external computer bus 605. In one embodiment, the external computer bus 605 is a Universal Serial Bus (USB) compliant bus.

Memory 220 can include instructions adapted to be executed by the processor 210 to perform a method in accordance with an embodiment of the present invention. The term "instructions adapted to be executed" is meant to encompass any instructions that are ready to be executed in their present form (for example, machine code) by a processor, or require further manipulation (for example, compilation, decryption, decoding, or provided with an access code, etc.) to be ready to be executed by a processor (for example, processor 210). In one embodiment, the memory 220 can include a graphical user interface (GUI) module 221 to implement a graphical user interface.

In another embodiment, the workstation 200 is coupled to a server 260 via a network 250. Examples of network 250 include the interne, a WAN (wide area network), LAN (local area network), an intranet, a communications network, a computer network, a combination thereof, etc. In one embodiment, the server 260 is coupled to a storage device that typically stores data on a magnetic medium such as a magnetic disk. For example, the storage device may store application programs and associated data files/documents. Examples of documents include word processing documents, spreadsheet documents, HTML (Hypertext Markup Language) documents, and the like. Workstation 200 can access data stored in the storage device via server 260 and network 250. In an embodiment, server 260 can display information on display 202 by sending information signals to workstation 200 via network 250. Examples of display information include data a GUI component, a web page, and the like.

Data 223 can encompass hierarchical data, non-hierarchical data, and the like. Data 223 can be a document corresponding to a particular application such as a word processing document, a spreadsheet document, an HTML document, and the like.

Computer instructions adapted to be executed by a processor to perform the embodied methods are stored on a computer-readable medium and distributed as software. The computer-readable medium can be a device that stores digital information. For example, a computer-readable medium includes a portable magnetic disk, such as a floppy disk; or a Zip™ disk, manufactured by the Iomega Corporation of Roy, Utah (Zip™ is a registered trademark of Iomega Corporation); or a Compact Disk Read Only Memory (CD-ROM) as is known in the art for distributing software. The computer-readable medium can be distributed to a user that has a processor suitable for executing instructions adapted to be executed.

While these embodiments have been described with emphasis on the embodiments, it should be understood that within the scope of the appended claims, the embodiments might be practiced other than as specifically described herein.

What is claimed is:

1. A method of providing data calls for a subscriber having an integrated services digital network for communicating with at least one party, comprising:
   a. forming a trunk line within the integrated services digital network for data calls, wherein the trunk line comprises a dedicated line connected to a network edge switch;
   b. placing data calls made by a subscriber on the trunk line using data packets;
   c. billing a fixed rate per service period for use of the trunk line by the subscriber regardless of a number of data calls placed from the integrated services digital network or duration of the data calls placed during a service period, wherein the service period is a calendar-based time period;
   d. monitoring the integrated services digital network during a data call; and
   e. permitting the data call to continue without additional charge when additional data calls are connected to the first data call.

2. The method of claim 1, further comprising:
   a. monitoring the integrated services digital network during the data calls to form usage information on a number of data calls placed, times of day data calls were placed and duration of data calls placed; and
   b. creating different fixed rate plans to the subscriber at termination of the service period.

3. The method of claim 2, wherein different fixed rate plans are based on a type of end-to-end connection with the trunk line.

4. The method of claim 3, wherein the end-to-end connection is a Data Enabling Device (DED) to DED connection or a DED to Switched Network connection.

5. The method of claim 1, wherein the service period is a member selected from the group consisting of: a week, a month, a calendar quarter, and a calendar year.

6. The method of claim 1, wherein the dedicated line is a dedicated ISDN T1.5 line.

7. A system for placing calls over an integrated services digital network at a fixed rate comprising:
   a. a trunk line comprising a dedicated line connected to a network edge switch for communication within an integrated services digital network with a central office;
   b. at least one base station associated with at least one subscriber for placing data calls over the trunk line from the base station; and
   c. billing apparatus adapted for billing the at least one subscriber at a flat rate per service period for data calls using said trunk line from a base station regardless of a number of calls placed or received during a service period, the service period being a calendar-based time period, said billing apparatus is to monitor the integrated services digital network during the data calls to form usage information on a number of data calls placed, time of day data calls were placed and duration of data calls placed; and to create different fixed rate plans for the subscriber at termination of the service period.

8. The system of claim 7, further comprising a network server for storing a subscriber profile for the at least one subscriber, wherein the subscriber profile includes billing data and subscriber service data.

9. The system of claim 7, further comprising an additional trunk line in communication with the network edge switch at the central office of the ISDN network.

10. The system of claim 7, wherein the trunk line further comprises an end to end connection, wherein the end to end connection is a Data Enabling Device (DED) to DED connection or a DED to Switched connection.

11. The system of claim 7, wherein the service period is a member of the group: a month, a week, a calendar quarter or a calendar year.

12. A tangible computer readable medium having stored thereon a plurality of instructions, the plurality of instructions including instructions which, when executed by a processor, cause the processor to perform:
   a. forming a trunk line within the integrated services digital network for data calls, wherein the trunk line comprises a dedicated line connected to a network edge switch;

b. placing data calls by a subscriber on the trunk line using data packets; and c. billing a fixed rate per service period for use of the trunk line by the subscriber regardless of a number of data calls placed from the integrated services digital network or duration of the data calls placed during a service period, the service period being a calendar-based time period;

d. monitoring the integrated services digital network during a data call; and e. permitting the data call to continue without additional charge when additional data calls are connected to the first data call.

13. The computer readable medium of claim 12, further comprising:

a. monitoring the integrated services digital network during the data calls to form usage information on a number of data calls placed, time of day data calls were placed and duration of data calls placed; and b. creating different fixed rate plans to the subscriber at termination of the service period.

* * * * *